Patented Aug. 30, 1932

1,874,260

UNITED STATES PATENT OFFICE

MAX ENGELMANN AND WENDELL H. TISDALE, OF WILMINGTON, DELAWARE, ASSIGNORS TO E. I. DU PONT DE NEMOURS & COMPANY, OF WILMINGTON, DELAWARE, A CORPORATION OF DELAWARE

WOOD PRESERVATION

No Drawing.   Application filed April 16, 1930. Serial No. 444,868.

This invention relates to the preservation of wood, and wood products, and more particularly to a wood preservative containing as an ingredient the reaction products of a mercury salt and a hydrocarbon derivative of a metal occurring above mercury in the electrochemical series.

In the copending application of one of us, Serial No. 427,433, filed February 10, 1930, compounds of the type R-Hg-X, in which R represents an alkyl or aralkyl group, while X represents an alkyl or aralkyl group, an acid radicle, a hydroxyl group, or the sulfhydryl group or its derivatives, in low concentrations, have been proposed as effective for the preservation of wood.

We have now found that compounds produced by the action of mercury salts of the type of R-Hg-X with a hydrocarbon derivative of a metal occurring above mercury in the electro-chemical series are particularly effective for the preservation of wood and wood products, so-called artificial lumber made from wood waste, and materials made from cellulosic fibres such as celotex, etc.

These compounds may be made in dust form by a one-step process in which the mercury salt is intimately mixed and caused to react with the alkyl or aryl derivative of the tetra valent metal, in the presence of dry soluble or insoluble diluents, such for example as lime, kaolin, magnesium sulfate, sodium sulfate, etc., or the reactions may be carried out in water or a solvent. The reaction mixture may be used without separating the R-Hg-X compound, or by mixing the isolated compounds.

In order to further illustrate our invention, the following examples are given but it will be understood that these are not to be taken in any way as limitations thereof as variations in proportions and compounds may be made within wide limits within the scope of the invention:

Example 1

One part of a reaction product obtained by interaction of two moles of mercury bichloride and one mole of tetra ethyl lead are dissolved in five thousand parts of water. Wood or woodpulp treated with this solution is protected against the attack of wood-destroying organisms. The reaction most probably takes place according to the following equation:

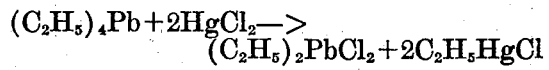
$$(C_2H_5)_4Pb + 2HgCl_2 \rightarrow (C_2H_5)_2PbCl_2 + 2C_2H_5HgCl$$

Example 2

One part of the reaction product of mercury acetate and tetra methyl tin in a proportion of four to one are dissolved in three thousand parts of water and used for the prevention of blue stain on timber.

Example 3

One part of the reaction product of mercury acetate and tetra phenyl lead dissolved in three thousand parts of water prevents entirely the growth of the wood-destroying organism, Coniophora cerebella.

Example 4

One part of propylmercury sulfate and one part of triethyl lead chloride are dissolved in five thousand parts of a mineral oil and used as a wood preservative.

By the term "organic derivatives" as used herein, we mean to include both the alkyl and aryl compounds.

As many apparently widely different embodiments of this invention may be made without departing from the spirit thereof, it is to be understood that we do not limit ourselves to the foregoing examples or descriptions except as indicated in the following patent claims:

We claim:

1. The process of preserving wood and cellulosic materials which comprises the treatment of said materials with the reaction products of a mercuric salt and an organic derivative of tetra valent lead.

2. The process of preserving wood and cellulosic materials which comprises the treatment of said materials with the reaction products of a mercuric salt and an alkyl compound of tetra valent lead.

3. The process of preserving wood and cellulosic materials which comprises the treatment of said materials with the reaction products of a mercuric salt and a tetra organic lead compound.

4. The process of preserving wood and cellulosic materials which comprises the treatment of said materials with the reaction products of a mercuric salt and a tetra ethyl lead compound.

5. The process of preserving wood and cellulosic materials which comprises the treatment of said materials with the reaction products of a salt of mercury taken from a group consisting of mercuric chloride and mercuric acetate, and an organic derivative of a tetra valent lead compound.

6. The invention of claim 5 in which the organic derivative of a tetra valent lead is tetra ethyl lead.

7. Wood or cellulosic materials impregnated with the reaction products of a mercuric salt and an organic derivative of tetra valent lead.

8. Wood or cellulosic materials impregnated with the reaction products of a mercuric salt and an alkyl compound of tetra valent lead.

9. Wood or cellulosic materials impregnated with the reaction products of a salt of mercury taken from a group consisting of mercuric chloride and mercuric acetate, and an organic derivative of a tetra valent lead.

10. As a wood preservative the reaction products of a mercuric salt and a tetra organic compound of a tetra valent lead.

In testimony whereof we affix our signatures.

MAX ENGELMANN.
WENDELL H. TISDALE.